United States Patent
Borosak (10) Patent No.: US 9,500,744 B2
(45) Date of Patent: Nov. 22, 2016

(54) LASER TRANSPONDER SYSTEM AND METHOD FOR DISRUPTING ADVANCED SPEED MEASURING LIDARS

(71) Applicant: Marko Borosak, Zagreb (HR)

(72) Inventor: Marko Borosak, Zagreb (HR)

( * ) Notice: Subject to any disclaimer, the term of this patent is extended or adjusted under 35 U.S.C. 154(b) by 274 days.

(21) Appl. No.: 14/351,171

(22) PCT Filed: Feb. 28, 2014

(86) PCT No.: PCT/HR2014/000010
§ 371 (c)(1),
(2) Date: Apr. 11, 2014

(87) PCT Pub. No.: WO2015/128682
PCT Pub. Date: Sep. 3, 2015

(65) Prior Publication Data
US 2016/0011302 A1    Jan. 14, 2016

(51) Int. Cl.
*G01S 7/495*     (2006.01)
*G01S 7/48*      (2006.01)
*G01S 7/489*     (2006.01)

(52) U.S. Cl.
CPC .............. *G01S 7/495* (2013.01); *G01S 7/4806* (2013.01); *G01S 7/489* (2013.01)

(58) Field of Classification Search
CPC ....... G01S 7/4806; G01S 7/489; G01S 7/495
See application file for complete search history.

(56) References Cited

U.S. PATENT DOCUMENTS

| | | |
|---|---|---|
| 5,359,404 A | 10/1994 | Dunne |
| 5,715,045 A | 2/1998 | Dunne |
| 5,793,476 A | 8/1998 | Laakmann et al. |
| 6,833,910 B2 | 12/2004 | Bøgh-Andersen |
| 2013/0105670 A1* | 5/2013 | Borosak ............. B60Q 1/143 250/214.1 |

FOREIGN PATENT DOCUMENTS

HR   WO 2012/001433 A1 *  1/2012  ............ B60Q 1/08

* cited by examiner

*Primary Examiner* — Francis M Legasse, Jr.
(74) *Attorney, Agent, or Firm* — RatnerPrestia (57) ABSTRACT

A laser transponder system for disrupting speed and/or distance measuring LIDARs. The system includes at least two laser transponders, a microcontroller and a user interface. The microcontroller is connected to both laser transponders, and to the user interface. Microcontroller analyzes input from the laser transponders and determines their output. In case an advanced speed measuring LIDAR signal is detected the microcontroller configures the first laser transponder as a transmitting only unit and the second laser transponder as a receiving only unit. Transmissions emanating from the transmitting only unit are not received by the receiving only unit. Disrupting signal periods are selected by the microcontroller algorithm from its pre-stored database according to a detected LIDAR signal. The disrupting signal is transmitted simultaneously with synchronizing a disruption timer for the next period of a disrupting signal and multiple disruption signal periods are timed in parallel on a given synchronization event.

9 Claims, 8 Drawing Sheets

LASER TRANSPONDER SYSTEM AND METHOD FOR DISRUPTING ADVANCED SPEED MEASURING LIDARS

CROSS REFERENCE TO RELATED APPLICATIONS

This application is the U.S. National Phase Application of PCT/HR2014/000010, filed Feb. 28, 2014, the contents of such application being incorporated by reference herein.

FIELD OF INVENTION

The invention relates to lasers, more specifically to laser transponders capable of disrupting the operation of vehicle speed measuring LIDARs.

PREVIOUS STATE OF ART

In the past decade vehicle speed measuring LIDARs have become a significant portion of devices used by agencies for road traffic speed enforcement. In some areas they have even replaced the use of vehicle speed measuring radars.

LIDARs (Light Detection And Ranging) have many advantages over radar for use in road traffic vehicle speed surveillance. Some of the main ones are the quick capture of vehicle speed (in a fraction of a second), the ability to target a specific vehicle even at great distances, and it is harder to detect and harder to disrupt its signal.

Unlike speed measuring radar which transmits a continuous radio wave signal and monitors frequency shift of a reflected signal (Doppler method) a LIDAR transmits short laser pulses and measures the time of flight (TOF) of each emitted laser pulse to its return as a reflection from the target. TOF is converted to a distance by using the speed of light constant. From sequentially measured distances the target speed is calculated (d2−d1)/(t2−t1) (cf. LASER-BASED SPEED . . . , U.S. Pat. No. 5,359,404, Dunne).

As vehicle speed measuring LIDAR use became widespread a countermeasure to the LIDAR appeared. First in the form of a LIDAR laser beam detector and secondly a speed measuring LIDAR disrupting device. A detector would be mounted on a vehicle and if the vehicle would be targeted by a speed measuring LIDAR the detector would instantly alert the driver. Since measurement time of speed measuring LIDAR is less than a second even an instant detector alert would not enable the driver to slow down quickly enough. This made speed measurement LIDAR detectors of limited use as a proper countermeasure.

Speed measuring LIDAR disrupting devices incorporate a detector and add a transmitter part. Also a signal processing part is enhanced so it does not only recognize speed measurement LIDAR signal but responds to that signal accordingly through a transmitter sending a disrupting signal.

Many embodiments of a LIDAR disrupting device have been suggested in the prior art. One embodiment (LASER TRANSPONDER . . . , U.S. Pat. No. 5,793,476 LAAKMANN) discloses a countermeasure laser transponder which incorporates a detector, signal processing, laser transmitter, user interface and other parts. The description teaches that upon detection of a speed measuring LIDAR laser beam the alert is given and a disrupting signal is transmitted. The disrupting signal constitutes a continuous pulse train of frequency between 0.8 MHz and 2 MHz. It is described that sending disrupting laser pulses with time periods between them that is shorter than TOF of a speed measuring LIDAR laser pulse, guarantees that the disrupting pulses will always arrive to the LIDAR before the arrival of the LIDAR laser pulse reflection. The described theory suggests that a LIDAR will always receive a disrupting laser pulse before it receives its own measurement laser pulse reflection and for that reason the distance measurement based on that pulse will fail or compute the wrong distance. Consequently the speed calculation will fail as well.

The described method has a weakness in that it sends a high laser energy disrupting signal that can easily be detected by the LIDAR signal processing unit which can then consequently initiate an alarm for the LIDAR operator. The described method can also be defeated by a LIDAR countermeasure detecting circuit (COUNTERMEASURE DETECTING CIRCUIT . . . , U.S. Pat. No. 5,715,045 DUNNE) which automatically reduces the LIDAR receiver threshold to remove disrupting signals.

Document (LASER TRANSPONDER . . . , U.S. Pat. No. 5,793,476 LAAKMANN) in the prior art section also describes another more sophisticated but more difficult to achieve (at the time) embodiment of a "LIDAR jammer". The described LIDAR jammer would operate by transmitting a disrupting signal having a pulse train frequency that matches the pulse repetition frequency of the laser signal of the speed measuring LIDAR. "Each pulse of the pulse train is transmitted so that it arrives at the LIDAR speed monitor sometime within the time period beginning when the LIDAR speed monitor transmits a pulse and ends when the LIDAR speed monitor receives the pulse reflected off the vehicle". The described speed measuring LIDAR disrupting method is known as frequency and phase matching (FPM) in the previous state of art. Unlike the previously described countermeasure it does not use a high frequency high laser energy disrupting signal. Disrupting laser pulses are only sent so they arrive to the speed measuring LIDAR when LIDAR is expecting to receive its own laser pulse reflection. It is more difficult for a LIDAR to detect such countermeasures because disrupting pulses are not present outside a time window of a speed measuring LIDAR pulse measurement. Since disrupting pulses are sent only when they can have an effect on the LIDAR instead of continuously, a much higher individual disrupting pulse laser energy can be used to increase the disrupting effect and still maintain very low average laser energy.

Prior art speed measuring LIDAR disrupting devices based on the FPM method use a synchronization event to maintain phase of a disrupting signal to the speed measuring signal. A synchronization event is one pulse of a speed measuring LIDAR signal that is used by the disrupting device to reset its time period (frequency) matching timer. A synchronization event is needed by such disrupting devices because of the differences in the stability of time base units of the disrupting device and speed measuring LIDAR. Differences in stability and resolution of time base clocks will cause drift of phase of the disrupting signal over time, as more disrupting pulses are sent in sequence the greater the drift of phase becomes. A synchronization event is also needed to determine whether the speed measuring LIDAR signal has ceased and the disrupting process needs to stop.

To receive a synchronization pulse (event) prior art disrupting devices need to stop transmitting their disrupting signal since their own transmissions will inherently trigger their own receiver. Speed measuring LIDAR disrupting devices need to have the highest possible receiver sensitivity and a wide reception optical angle to successfully detect a speed measuring LIDAR signal coming from different optical angles or even when not directly aimed at the disrupting device. Such prior art disrupting devices high sensitivity receivers are inherently susceptible to their own disrupting transmissions when they return as reflections of road or roadside objects.

This deficiency of prior art frequency and phase matching disrupting devices consequently means that some of the speed measuring LIDAR pulses will not be disrupted.

Document (cf. PULSED LASER SIGNAL DISRUPTING DEVICE . . . , US 20130105670A1, BOROSAK) describes a LIDAR disrupting device based on frequency and phase matching method (FPM) as stated by using a prior art method with a fixed emitted frequency identical to the received signal frequency, which is not required to respond to every and each received signal.

One embodiment that uses a frequency and phase matching method (LASER TRANSPONDER, U.S. Pat. No. 6,833, 910 BOGH-ANDERSEN) to disrupt operation of a speed measuring LIDAR adds to the method a novelty of transmitting a disrupting signal with a pulse repetition frequency different than the one of a speed measuring LIDAR signal that is being disrupted. The described method deviates from frequency matching as described previously but as it describes in FIG. 4, step 51, it still uses a free of disrupting transmissions synchronization event to calculate a proper "time window" and discover an end of speed measuring signal.

Document (LASER TRANSPONDER . . . , U.S. Pat. No. 5,793,476 LAAKMANN) also describes other deficiencies of the frequency and phase matching speed measurement LIDAR disrupting method. At the time the required components (high speed and precision processing units, laser diodes and laser diode drivers, etc.) necessary for such embodiment were scarcely available and at great cost. At the present time all required components for such an embodiment are widely available at low cost. It is no longer a problem for a modern processing unit to accurately measure pulse repetition frequency of a speed measuring LIDAR beam and to maintain phase of a disrupting signal to speed measuring signal.

Another described deficiency of the method still valid today is that "such LIDAR jammers can be defeated simply by adjusting the LIDAR speed monitor to transmit a pulse train having an unstable, random or programmed pulse repetition rate".

Usual speed measuring LIDARs have a known and fixed pulse repetition frequency but there are more modern speed measuring LIDAR types that have unstable or programmed pulse repetition rates. Such modern LIDARs can still be disrupted by modern disrupting devices based on frequency and phase matching method. Such modern disrupting devices usually have a database of pre-stored values of modern LIDAR type frequency deviations and use those values to track changes in LIDAR pulse repetition rate and keep sending disrupting signal in phase with unstable speed measuring signal. Modern disrupting devices can also have a period pattern database of a modern LIDAR with pre-stored pulse repetition patterns and can track changes of a speed measuring LIDAR pulse frequency according to pre-stored pattern.

Recently a new type of modern speed measuring LIDAR has appeared that transmits speed measuring laser beam with random pulse repetition rate, a most significant deficiency of a prior art frequency and phase matching disrupting method. This Advanced LIDAR additionally exploits the foremost mentioned deficiency of prior art frequency and phase matching disrupting devices, which is that some of the speed measuring signal pulses are not disrupted for the synchronization event to take place free of disrupting transmissions.

SUMMARY OF INVENTION

The present invention overcomes the observed deficiencies of prior art disrupting devices and describes a device and method for disrupting operation of both advanced and standard speed measuring LIDARs.

A laser transponder system and method for disrupting the operation of vehicle speed measuring LIDARS. Including advanced speed measuring LIDARs that are immune to standard frequency and phase matching disrupting process. Speed measuring LIDAR transmits a pulsed laser beam towards a target vehicle which is detected by a pair of laser transponders on the vehicle. A central processing unit that is connected to both laser transponders processes received signals and determines output signals. An alert is given and a disrupting signal is sent back to the speed measuring LIDAR by the first laser transponder becoming a transmitting only transponder. The second transponder becomes a receiving only transponder and continues to receive speed measuring LIDAR laser beam pulses. Laser transponders are separated and the receiving only transponder sensitivity is automatically reduced so it does not receive the disrupting signal emanating from the transmitting only transponder. Every pulse of the speed measuring laser beam is received and used for frequency and phase matching. In return the disrupting signal is able to disrupt all pulse measurements of the speed measuring laser beam. Disrupting pulses are correctly transmitted so at least one of them arrives at the LIDAR during its measurement time window, consequently disrupting the operation of vehicle speed measuring LIDAR, including advanced LIDARs.

BRIEF DESCRIPTION OF THE DRAWINGS

The invention is best understood from the following detailed description when read in connection with the accompanying drawing. Included in the drawings are the following figures.

DETAILED DESCRIPTION OF THE INVENTION

An aspect of the present invention enables construction of an effective countermeasure device to the advanced speed measuring LIDARs. Advanced speed measuring LIDARs are immune to standard countermeasure devices that use standard frequency and phase matching (FPM) disrupting method. Standard FPM disrupting methods can only be effective if pulse periods (frequency) of a speed measuring LIDAR signal is completely predictive. Additionally the operation of a LIDAR will be disrupted only if the LIDAR is not designed to purposely recognize and use every nth of its pulse measurements that have completed during a synchronization event of a disrupting device.

Standard speed measuring LIDARs that have fixed pulse periods are predictive by definition. A disrupting device needs to measure the pulse period T and can then directly use that period as a disrupting period D (T=D). Multiple speed measuring pulses in a sequence can be disrupted 1D, 2D, 3D, 4D, . . . synchronizing the D period on every nth pulse of the speed measuring signal.

Unstable pulse rate LIDARs similar to standard LIDARs have almost fixed pulse periods that slightly vary in length from period to period. They are predictive by learning the way they achieve period deviations, or their instability can be compensated by transmitting a longer disrupting pulse or pulse train that will cover all possible deviations of period length.

Pre-programmed pulse rate LIDARs significantly vary their pulse periods from pulse to pulse but periods are determined according to a pre-stored period sequence table in a LIDAR database. If this period sequence table is known then a disrupting device can use it to predict which period value will be next on a given synchronization event.

In case of advanced speed measuring LIDARs that have random pulse repetition rate a sequence of periods can't be predicted on a given synchronization pulse since they are randomly chosen by the LIDAR. Even if periods could be predicted and a disrupting signal sent in phase after synchronization pulse an advanced LIDAR will recognize its measuring pulse that was used as a synchronization event and was not disrupted and will calculate speed based on such pulses.

A solution for an effective advanced LIDAR operation disrupting device as the present invention describes is in a device that will disrupt all measurement pulses of a LIDAR device and will correctly transmit disrupting pulses so they arrive during the measurement time window of a LIDAR.

The present invention solves the problem of a synchronization event by a novel method of sending a disrupting signal while synchronizing a timer for the next period of a disrupting signal. This is achieved by using a pair of laser transponders or by having separate modules for a laser receiver and for a laser transmitter. Laser transponders should be separately mounted with some distance between them to avoid cross talk of transmitting signal on the receiver. A microcontroller is connected to both laser transponders and is analysing received signals. When an advanced LIDAR signal is detected it reconfigures inputs and outputs so that the first transponder becomes a transmitting only unit and the second transponder becomes a receiving only unit. The microcontroller then performs an algorithm that discovers a maximum level of receiving transponder receiver sensitivity on which there is no echo triggering on transmissions emanating from the transmitting transponder. The determined level of maximum allowable sensitivity with no echo triggering depends on conditions such as weather (fog, snow), obstacles in front of a vehicle at a given moment, reflectivity of the road, etc. If maximum allowable sensitivity is not correctly determined or conditions change, the disrupting transmission could, when reflected off of obstacles and arrives to a receiver—trigger it and cause a false synchronization event to happen possibly resulting in an oscillating loop. For that reason the microcontroller can perform a discovering algorithm repeatedly during a disruption process or can reduce maximum allowable sensitivity from a determined value by a safety margin.

Every speed measuring laser pulse received by the receiving only transponder is a synchronization event, but every speed measuring laser pulse is also disrupted by a disrupting transmission that was timed by a timer that was synchronized on a previous speed measuring laser pulse. Since the receiving transponder only receives speed measuring laser pulses and does not receive a disrupting transmission that is emitted at the same moment it is possible to synchronize the disrupting timer on all speed measuring pulses and at the same time to disrupt all speed measuring laser pulses. The timer used for timing a disrupting transmission is synchronized (reset) on a received speed measuring laser pulse and when it times out it will initiate a disrupting transmission that will arrive at speed measuring LIDAR during its next measuring time window, during the disrupting transmission a new speed measuring laser pulse is received and the timer is immediately reset (synchronized) for another cycle of operation.

In theory the sequence of periods on a given synchronization event of an advanced speed measuring LIDAR with random pulse repetition rate can't be predicted. In practice it is possible to alleviate this problem by studying the specific advanced speed measuring LIDAR type and group its characteristic period lengths statistically. Usually such advanced LIDARs use specific groups of characteristic period lengths which they randomly interchange because of computer algorithm type reasons or interconnectivity with other equipment reasons. Group of possible periods is then known for such an advanced LIDAR for a given synchronization event.

An aspect of the invention discloses another novelty of timing multiple disruption signal periods in parallel on a given synchronization event in case of such an advanced speed measuring LIDAR. By doing that disrupting the next speed measuring pulse will be achieved regardless of which speed measuring pulse period is next from the group of periods. When the next speed measuring pulse actually arrives and is detected by a receiver the current cycle of disrupting all possible periods from the group is stopped so not all periods in the group will initiate a disrupting transmission on every synchronisation, unless it happens to be the longest value period of the group. The cycle is repeated based on this new synchronization event and thus all speed measuring pulses are disrupted. Transmitting multiple disrupting transmissions timed on each possible period from the group on a given synchronization event means that in each cycle most of the disrupting transmissions will be out of the LIDAR time window but also that one of the transmissions will arrive during the measurement time window of a LIDAR.

The present invention can be used as described in defense as a countermeasure to a distance measuring LIDAR as well since such devices use the same principle of operation.

Also the present invention method can be applied to standard speed measuring LIDARs with a fixed pulse repetition frequency if for some reason standard FPM disrupting method can't be used. In such a case detected speed measuring LIDAR signal period T is measured by the microcontroller algorithm and is used as a disrupting period D. A database with characteristic group of periods is then not necessary. Transmitting multiple periods of a disrupting signal in parallel on a given synchronization event is also not used since there are no multiple possible periods of the speed measuring signal but one constant period T. Such a disrupting method will benefit in performance versus standard FPM method since all speed measuring LIDAR pulse measurements are disrupted.

The described laser transponder system comprises at least two laser transponders, a microcontroller connected to both transponders and a user interface connected to the microcontroller. Laser transponders in another embodiment can be a dedicated laser receiving unit and a dedicated laser transmitting unit. A set of multi-colour LEDs, a speaker and buttons presents a user interface which displays/sounds system status to a user. The buttons of a user interface are used to input user actions to the system for instance to stop the disrupting process prematurely or to put the system to sleep (turn off).

The purpose of a microcontroller is to analyse received signals and to determine according output signals. It also communicates with the user via a user interface. Its input signals are receive signals from laser transponders and control signals from a user interface and its output signals are transmit and program signals to the laser transponders and alert signals to a user interface. The microcontroller program code executes a speed measuring LIDAR signal detection algorithm, standard and advanced speed measuring LIDAR disruption algorithms, a maximum allowable sensitivity discovering algorithm and other maintenance algorithms (power off, power on, premature disruption end, etc.).

A pulsed-laser detector component of a presented device will detect the arrival of laser pulses and will convert optical signals to electrical impulses which are then sent to a microcontroller unit. The pulsed-laser detector component used in the presented invention is documented in my previous invention (Pulsed-Laser detector with improved sun and temperature compensation, EP2277060 BOROSAK). Said detector circuit is enhanced in the present invention by adding a communication line between the detectors gain setting microcontroller and the main laser transponder system microcontroller. Over that line, the main system microcontroller commands the maximum allowable sensitivity setting to the detectors gain setting microcontroller.

The laser transponder transmitter component converts an electrical signal initiated by the microcontroller to an optical signal. Conversion is performed by a pulsed laser diode which outputs pulses of light. The laser diode output is not fed to a collimator so the light radiation pattern is not coherent but spreads to an optical angle of 30 degrees which is optimal for the purpose of the present invention. The transmitter component additionally comprises of an overcurrent protection circuit, driver circuit and impulse conditioning circuit.

Preferred Embodiment

The circuitry and the functional detail of the preferred embodiment in accordance with the invention will be explained in detail in the following paragraphs.

Figure 1A:
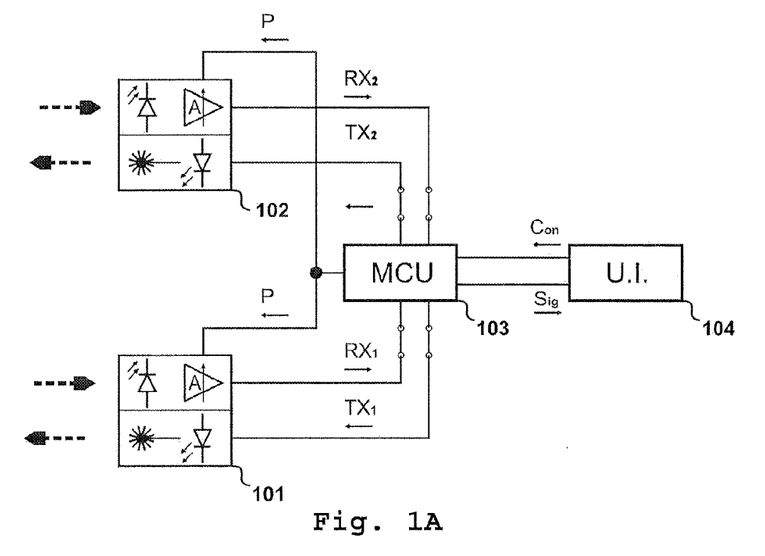
FIGS. 1A and 1B show block diagrams of exemplary circuits showing a microcontroller switching from a standard LIDAR disrupting method to an advanced LIDAR disrupting method in a case when an advanced speed LIDAR signal is detected. Two laser transponders and a user interface are connected to the microcontroller.
Figure 1B:
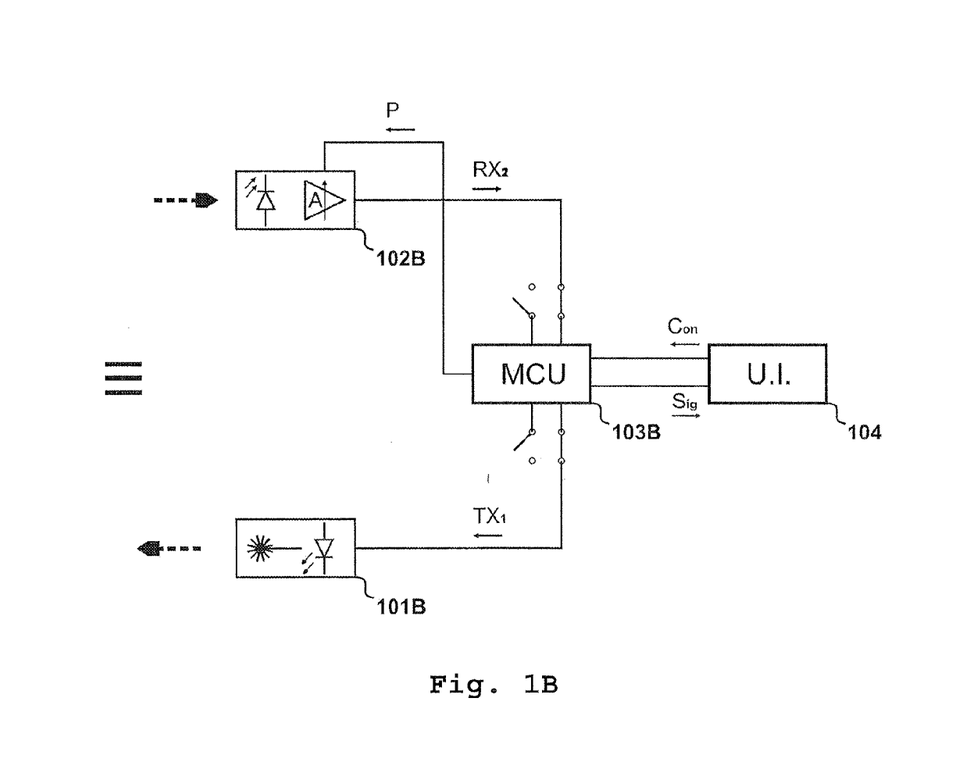

FIGS. 1A and 1B illustrate the block diagram of a laser transponder system according to an aspect of the present invention. Left side of the figure shows the system in standard configuration that is used for the standard frequency and phase matching disrupting process and right side of the figure shows the system has switched configuration to an advanced frequency and phase matching disrupting process. In the advanced FPM disrupting process configuration first laser transponder 101 becomes a transmitting only transponder 101B and the second transponder 102 becomes a receiving only transponder 102B. The microcontroller 103 is connected to both transponders 101, 102 and is analysing input from them $RX_1$, $RX_2$ signal, determines their output $TX_1$, $TX_2$ signal and control their maximum receiver sensitivity level by P command signal. The microcontroller 103 algorithm performs reconfiguration of microcontroller 103 inputs and outputs when an advanced speed measuring LIDAR signal is detected. Gain of the receiving only transponders 102B receiver is adjustable via P signal by the microcontroller 103B. The discovering algorithm of the microcontroller 103 discovers maximum allowable receiver sensitivity on which there is no echo triggering on transmissions emanating from the transmitting only transponder 101B. User interface 104, 104B is connected to the microcontroller 103, 103B. It sounds/displays alerts to the user and inputs user commands to the system, for instance powering off/on or prematurely stopping the disruption process.

Figure 2A:
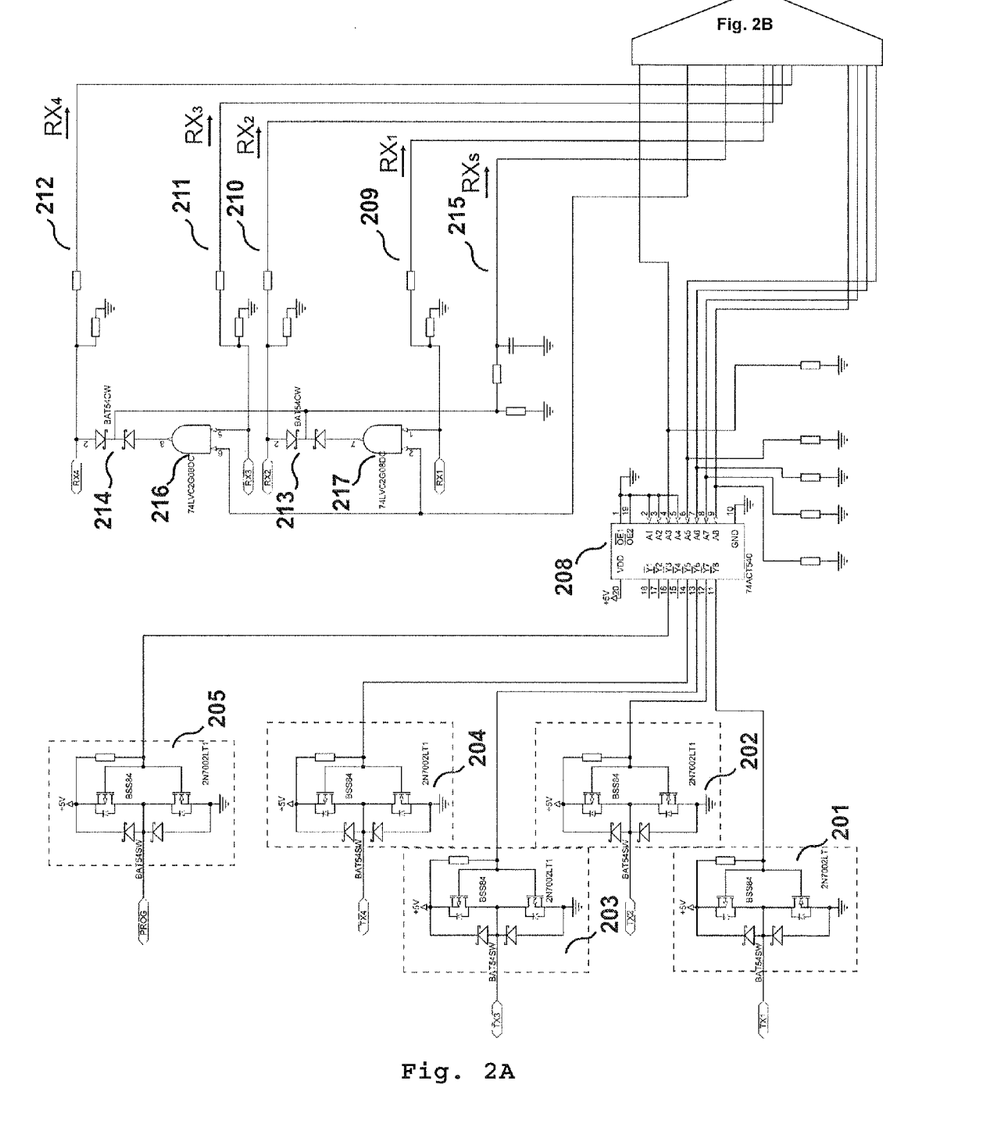
FIGS. 2A and 2B show a circuit schematic of a microcontroller module and user interface module. Transmit TX output, receive RX input and communication PROG output signals are shown.
Figure 2B:
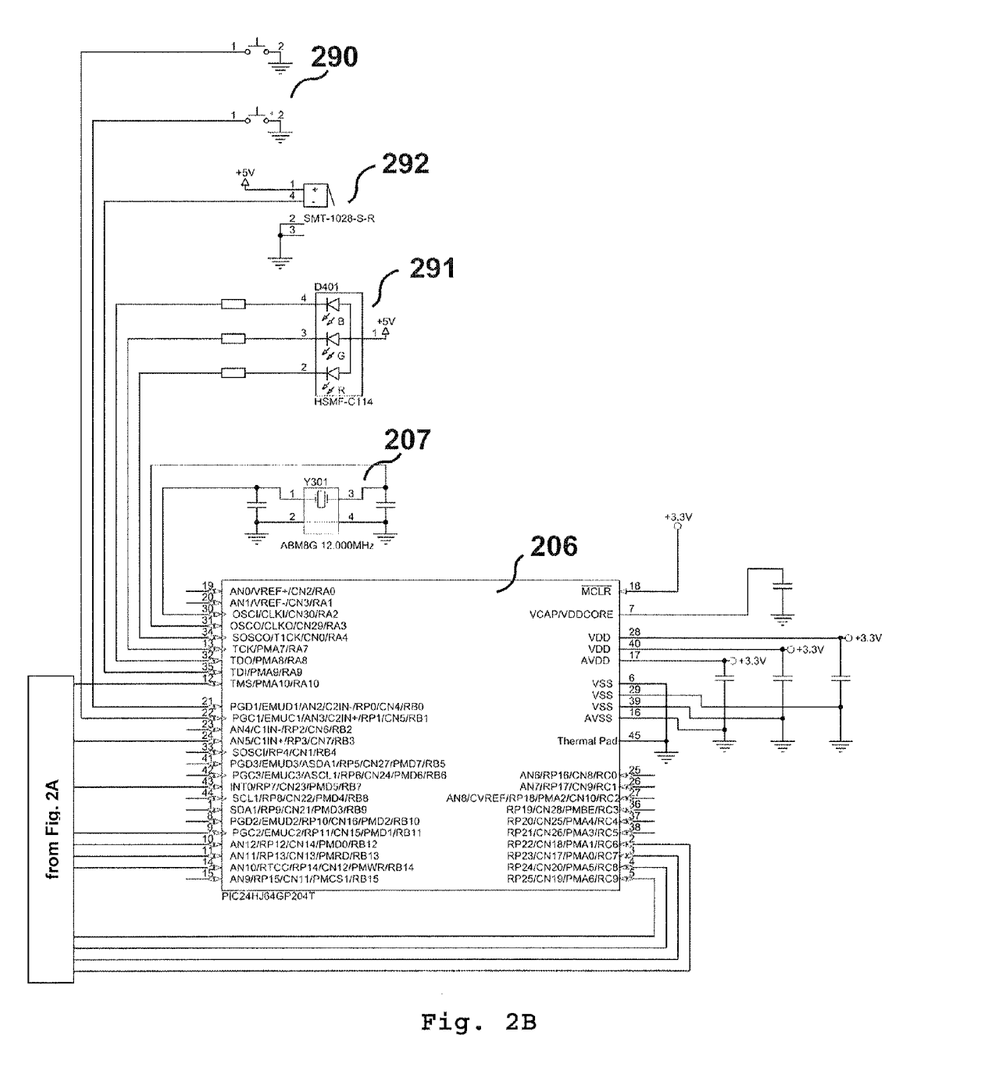

With reference to FIGS. 2A and 2B the preferred embodiment will be disclosed in detail. Microcontroller 206, preferably the Microchip PIC24HJ128GP204 is used for performing the algorithm logic of the program and for storing pre-stored constants and database. An instruction time of only 20 ns results in good resolution of its timers and in the high speed of program and algorithm execution. FIGS. 2A and 2B show the layout of microcontroller 206 pins, the power supply pins are connected to power supply and appropriate decoupling capacitors. Microcontroller 206 external oscillator pins are connected to the crystal 207 with a resonating frequency of preferably 12.000 MHz. High frequency and temperature stability crystal 207 is used such as ABM8G-12.000MHZ with less than 50 ppm tolerance. A stable oscillator source will ensure that disrupting period values pre-stored in the database when used for disrupting of advanced speed measuring LIDAR will not deviate in length and cause a shift in phase of the disrupting signal.

In preferred embodiment the Microcontroller 206 has separate signal pins for controlling up to four laser transponders. Ideally two laser transponders 101, 102 first and second are mounted on the front of the vehicle looking ahead of the vehicle and two transponders third and fourth are mounted at the rear looking behind.

Microcontroller 206 has four transmit output signals $TX_1$, $TX_2$, $TX_3$ and $TX_4$ from pins 2, 3, 4 and 5 respectively. Transmit output signals are fed to the laser transmitter sections of the laser transponders 101, 102 and they direct the transmission of laser disruption pulses. Microcontroller 206 can activate transmit output signals $TX_1$, $TX_2$, $TX_3$ and $TX_4$ individually, in groups or all at once. Said transmit output signals are preferably first fed to a level converter 208 preferably an Onsemi 74ACT540 inverting buffer that is converting the 3.3 V signal levels from the microcontroller 206 to a TTL 5 V signal levels. Converted transmit output signals are then fed to the CMOS-transistor inverting drivers 204, 203, 202, 201 comprising of preferably Onsemi BSS84 P-MOS and 2N7002 N-MOS transistors. CMOS-transistor drivers 204, 203, 202, 201 invert the transmit output signals and amplify their current capacity so higher loads could be driven for instance a very long connecting cable to the laser transmitter section.

Communication PROG output signal is generated on microcontroller 206 pin 12 and is also fed to the level converter 208 where its signal level is changed to TTL 5 V levels and then to the CMOS-transistor inverting driver 205. Communication PROG output signal is fed to the laser transponders 101, 102 receiver sections or more accurately to the gain controlling microcontroller of the laser receivers. Communication PROG signal preferably comprises of commands sent on standard UART serial protocol where single byte data is sent and each byte value represents a command to the gain setting microcontroller to set the upper limit of laser receiver sensitivity to the value same as the data byte value.

Microcontroller 206 has four receive input signals $RX_1$, $RX_2$, $RX_3$ and $RX_4$ on pins 9, 10, 11 and 14 respectively. Receive input signals are generated by the laser receiver sections of the laser transponders 101, 102. When an optical laser pulse is detected by the laser receiver an electrical receive input pulse is sent on receive input signal line. In preferred embodiment microcontroller 206 program code creates an interrupt event on arrival of a receive pulse on any of the receive signal lines 209, 210, 211, 212. Interrupt handler program of the microcontroller 206 checks on which individual line the receive pulse has arrived and sets appropriate flag indicator and then proceeds to the signal analysis program. Microcontroller 206 program code in the case that advanced speed measuring LIDAR signal is detected disables the receive signal lines 209 and 211, pins 9 and 11 by internally grounding them and thus prevents signals $RX_1$ and $RX_3$ from causing an interrupt effectively turning first 101B and third laser transponder into transmitting only transponders. Also, in that case the disrupting signal will be only generated on transmit output signals $TX_1$ and $TX_3$, pins 2 and 4 of the microcontroller 206, preferably by reconfiguring pins 3 and 5 to inputs.

In an alternative embodiment four receive input signals $RX_1$, $RX_2$, $RX_3$ and $RX_4$ are summed by a diode array preferably an Onsemi BAT54CW pair 213, 214, and then sum signal $RX_S$ is fed to a single input pin 43 of the microcontroller 206. Input signals $RX_1$ and $RX_3$ are first fed to an individual two port AND gates 216, 217, such as Fairchild 74LVC2G08 before being summed. A control output signal from the microcontroller 206 pin 24 is fed to second port of both AND gates 216, 217 and controls if input signals $RX_1$ and $RX_3$ will be summed or not. In the case that advanced speed measuring LIDAR signal is detected this control signal will be set low and signals $RX_1$ and $RX_3$ will not be summed. Pin 43 of the microcontroller 206 is an INT0 interrupt input that is used in the alternative embodiment for processing of summed receive signal $RX_S$.

The controlling key button pair 290 preferably TYCO MSPS103C0 inputs user commands to the microcontroller 206. The first button is used to turn the device on/off or more precisely put the microcontroller 206 into sleep mode. The second button is used to prematurely stop the disrupting process once it has started, if the user wants to do so. The speaker 292 preferably of type SMT-1025-S-R by PUI audio sounds the alerts to the user. LED RGB display 291 preferably HSMF-C114 by Avago shows to the user the status of the device, green light for turned on and ready and red light for alert. Alerts are initiated by the microcontroller 206 program logic in case of a speed measuring LIDAR signal is detected and disruption process has started. Electrical power to the circuit is supplied over +5 V and +3.3 V power lines.

Figure 3A:
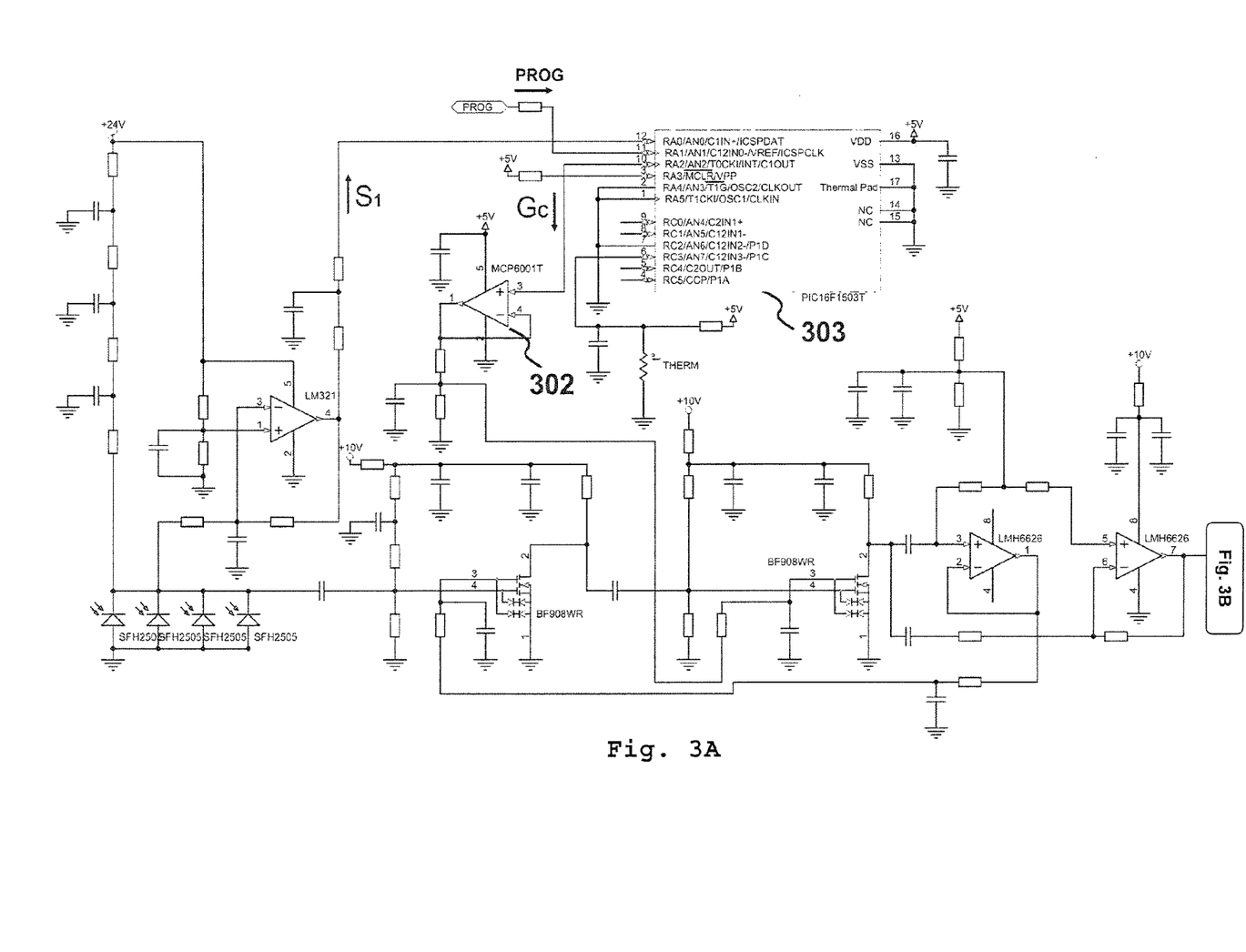
FIGS. 3A and 3B show a receiver circuit of a laser transponder showing photodiodes, transistor amplifiers, operational amplifiers, comparators, mono-stable, temperature detector and gain control section with a gain controlling microcontroller. Receive RX output signal and communication PROG input signals are shown on circuit schematic.
Figure 3B:
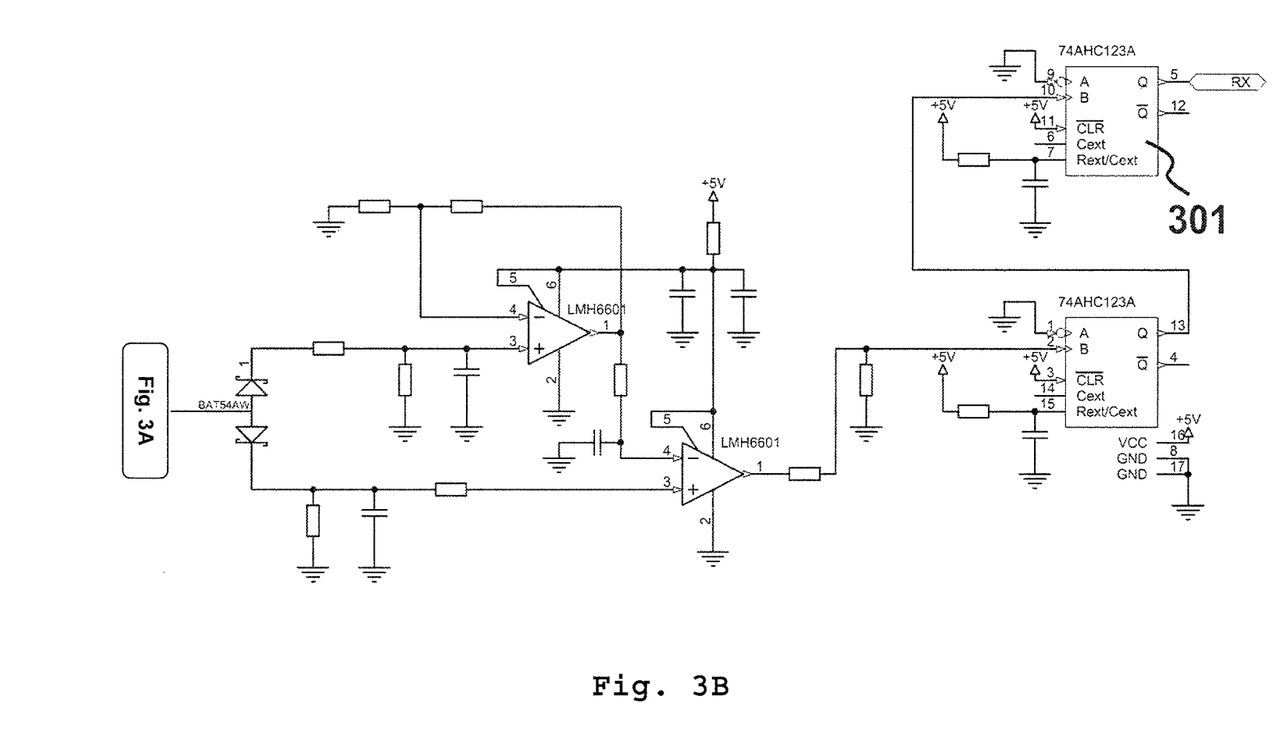

A preferred embodiment of laser receiver part of the laser transponders 101, 102 according to an aspect of the present invention is shown on FIGS. 3A and 3B. The pulsed-laser detector from my previous invention (Pulsed-Laser detector with improved sun and temperature compensation, EP2277060 BOROSAK) is enhanced and used as a laser receiver. It should be understood that other pulsed-laser receivers could be used as well in alternative embodiments of the present invention. In one alternative embodiment a pulsed laser receiver with a permanently low sensitivity is used so the additional sensitivity limiting circuits and program algorithms described below are not necessary to achieve no echo triggering of receiving only transponder on transmissions emanating from transmitting only transponder.

Said preferred embodiment detector circuit is enhanced in the present invention by adding a communication line with communication signal PROG between the detectors gain setting microcontroller 303 and the main laser transponder system microcontroller 206. The main system microcontroller 206 commands the maximum allowable sensitivity setting via PROG signal to the detectors gain setting microcontroller 303. The signal PROG preferably comprises single byte serial commands that are sent by an UART module on the main microcontroller 206 and are received by an UART module on the gain setting microcontroller 303. Gain setting microcontroller 303 is preferably a Microchip PIC16F1503, 8-bit unit with embedded DAC peripheral. Said DAC peripheral is used instead of the external DAC R2R ladder used in the original Pulsed-Laser detector, EP2277060, to generate gain setting signal $G_c$. Gain setting signal $G_c$ current is amplified by an operational amplifier 302 preferably a Microchip MCP6001 so it could drive a larger resistive and capacitive load without loss of accuracy in the voltage level. Gain setting microcontroller 303 program is as described in original Pulsed-Laser detector, EP2277060 with the addition that gain control signal level can be limited and that ceiling value is determined by a command received on PROG signal.

Output Q of the final stage monostable 301 is the output of the laser receiver, the RX signal. Electrical power to the circuit is supplied over +24 V, +10 V and +5 V power lines.

Figure 4:
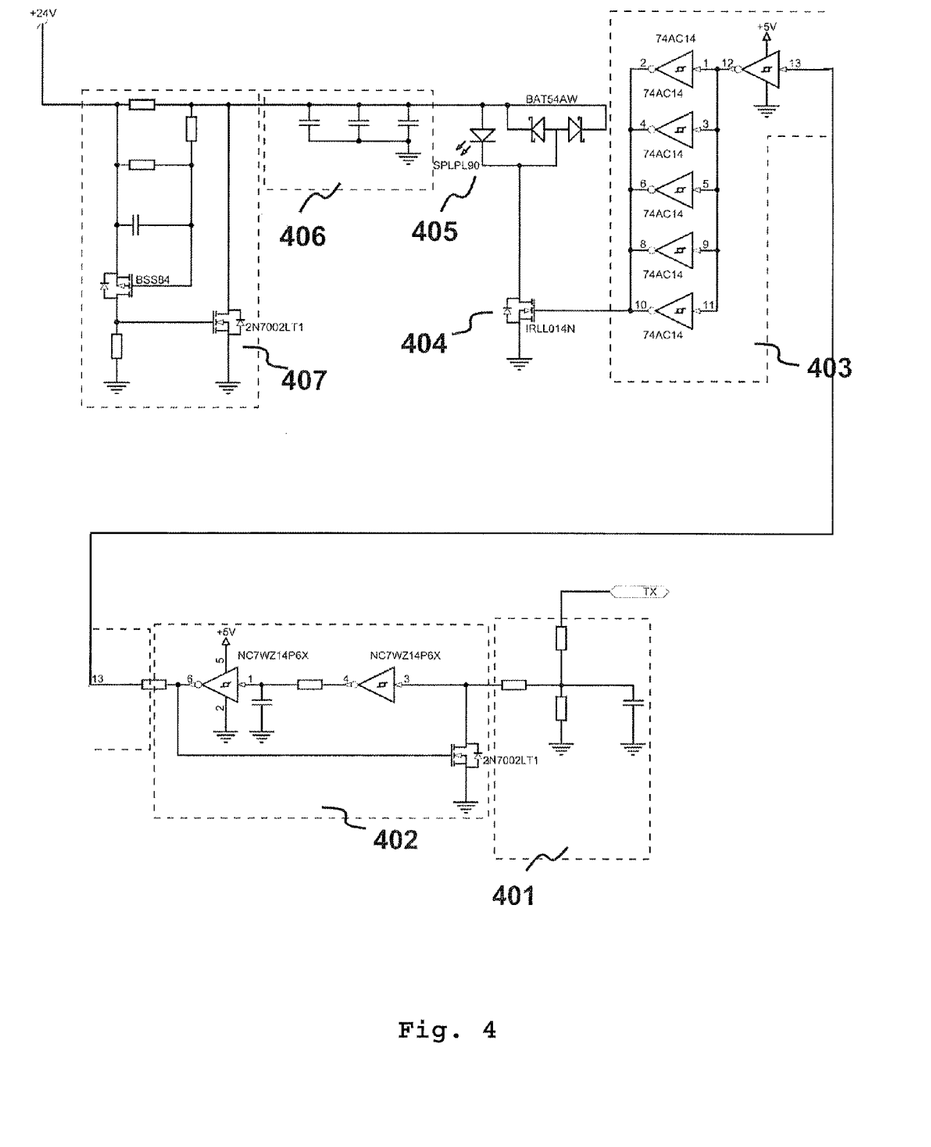
FIG. 4 shows the laser transmitter circuit schematic of a laser transponder showing the overcurrent protection circuit, laser diode with an output transistor, driver circuit and impulse conditioning circuit. Transmit TX input signal is shown.

FIG. 4 discloses a pulsed-laser beam transmitter circuit as part of a laser transponder 101, 102. A transmission command signal enters the circuit through the TX input and is brought to a filtering RC combination of components 401. Any noise accumulated over the connecting cable is filtered out and only 5 V TTL level impulses pass to pulse conditioning circuit 402. Pulse conditioning circuit 402 is preferably realized with Fairchild NC7WZ14 inverting gates pair connected in series through an R-C signal shortening element combination. This way any length of signal entering the circuit will be shortened to approximately 30 ns in length which is an optimal length for the purpose of the present invention. Conditioned transmission signal now enters a driver integrated circuit 403, preferably consisting of Fairchild 74AC14 hex Schmitt inverter gates connected in parallel. Signal current capability is now increased and is brought to a laser diode output transistor 404, preferably International Rectifier IRLL014N. The output transistor 404 converts the trigger signal into a high current signal through a laser diode 405. The laser diode 405, preferably Osram SPLPL90_3 converts a part of the electrical energy given by a high current to optical laser energy which radiates towards the target. High impulse current is supplied by an array of fast storage decoupling capacitors 406 consisting of preferably Murata 470 nF capacitors.

In case of a fault and overcurrent through the laser diode 405 an overcurrent protection circuit 407 will activate and disengage the laser diode 405 from the circuit. The overcurrent protection circuit is resettable by shortly removing the power supply from the circuit. Electrical power to the circuit is supplied over +24 V and +5 V power lines.

Figure 5A:
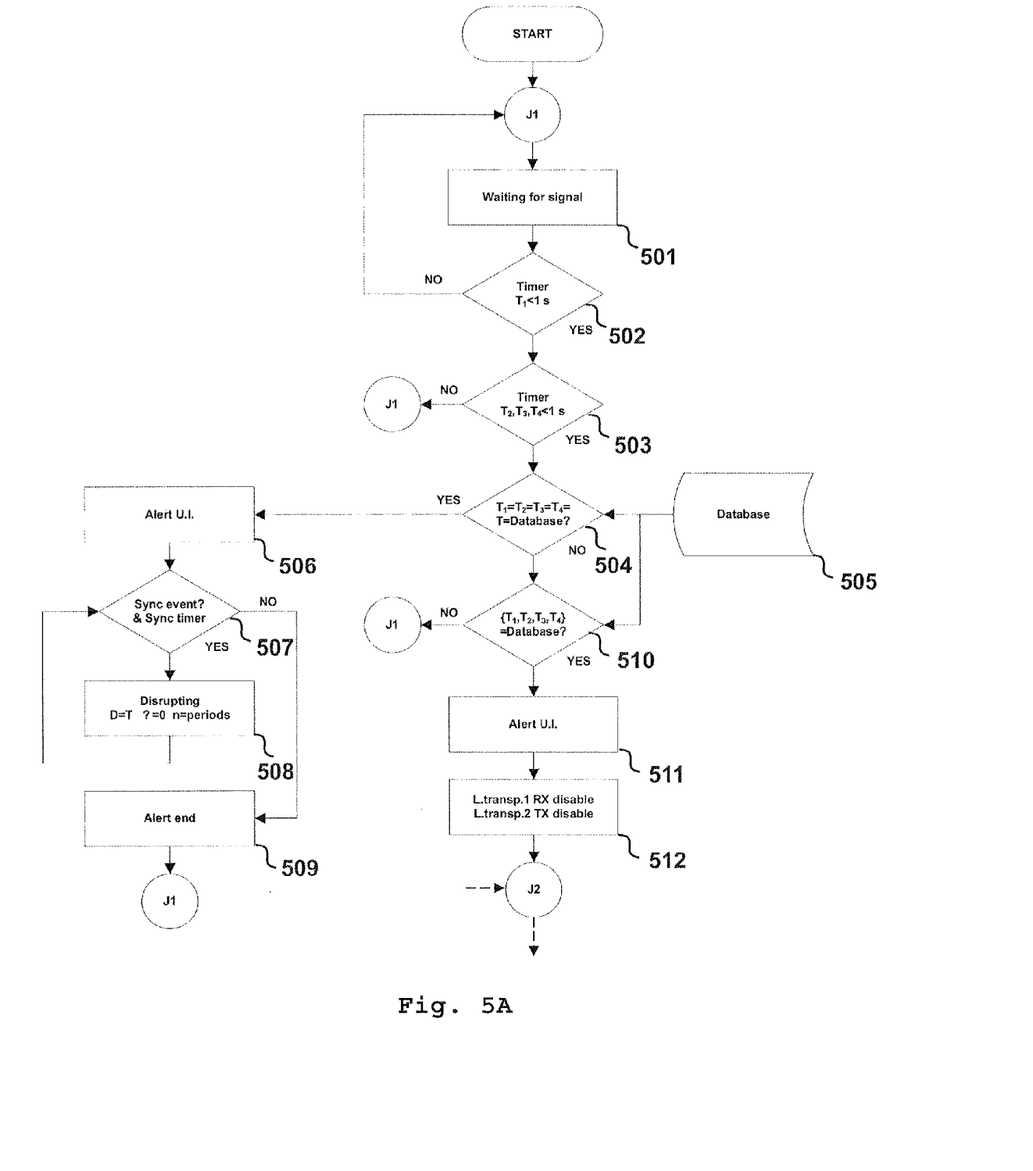
FIGS. 5A and 5B disclose the flow chart describing the program algorithm of the microcontroller.
Figure 5B:
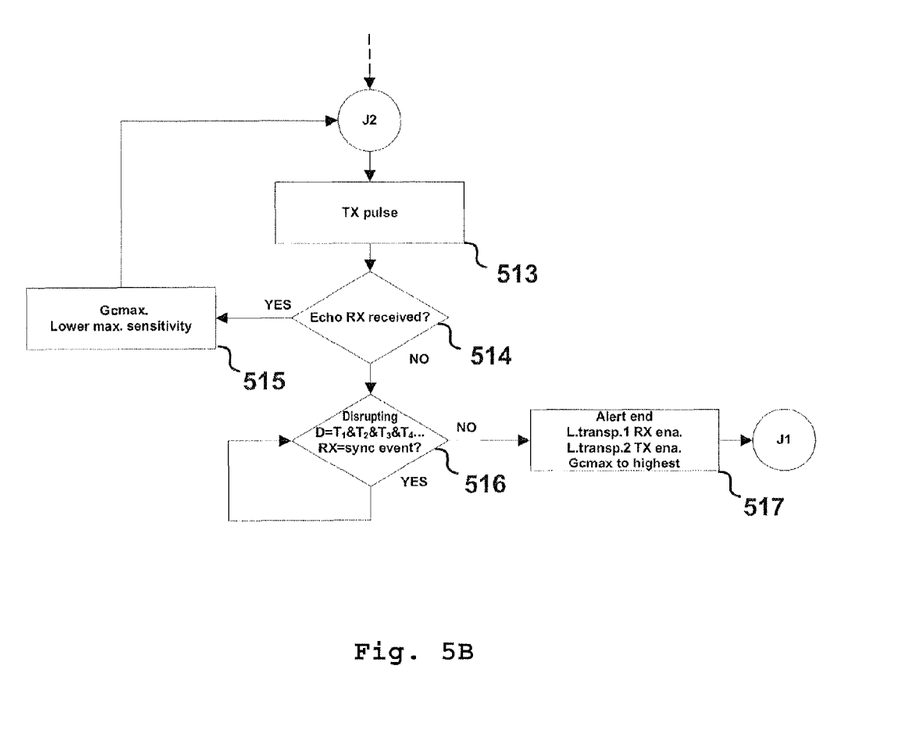

The logic of the algorithm is illustrated by the flow chart in FIGS. 5A and 5B. Said Microchip PIC24HJ128GP204 microcontroller has available 8192 16-bit registers that represent its RAM memory and 42600 24-bit flash words that represent its program and ROM memory.

Variables used by the program logic are located in the RAM registers. The microcontroller ROM memory is preferably used for storing the Program code, Database data and Constants and should be pre-programmed adequately.

All the Constants and the Database data used in the program logic are located in the said ROM memory locations.

The 32-bit timer counter unit TMR4/5 in the microcontroller 206 is used for measuring and timing of both speed LIDAR and disrupting pulse periods. The timer unit range is from 1 up to $2^{32}$ instruction cycles. Construction of the Microchip PIC24HJ128GP204 microcontroller is such that one instruction cycle takes two periods of the crystal oscillator 207 signal that is feeding the microcontroller 206 multiplied by a set PLL factor of 8.33.

Preferably, the clock frequency of the crystal oscillator 207 is selected to 12 MHz that results in one instruction cycle time and timer resolution of 20 ns. The 32-bit timer unit range is then 85.899 seconds. Timer resolution of 20 ns applies when measuring the pulse period (frequency) of a speed measuring LIDAR signal and also when timing a disrupting pulse period. Time window of a single pulse measurement of a speed LIDAR—targeting a vehicle at a distance of 100 m is 600 ns (100 m×2×3 ns/m). Since timer resolution is much lower than the average time window of a speed LIDAR pulse measurement 20 ns<<600 ns, set timer resolution is adequate for the disrupting process.

There are four loop areas in the program logic, the start-up/stand-by routine 502, disrupting a standard speed measuring LIDAR with a fixed pulse period routine 507, disrupting an advanced speed measuring LIDAR with random pulse repetition period routine 516 and discovering maximum allowable receiver sensitivity routine 514. A database 505 is present in the program and is available to blocks 504 and 510. The database is pre-stored and contains a table of standard speed measuring LIDAR signal periods and a table of advanced speed measuring LIDAR groups of characteristic periods.

On start the program enters an infinite loop of start-up/stand-by routine consisting of blocks 501 and 502. In this loop the program is waiting for reception of pulses on receive RX signals, first pulse in block 501 and then second pulse in block 502 and measures the time period $T_1$ between two received pulses 502. If measured time period $T_1$ is smaller than 1 second the program exits the loop to block 503 and if it is longer than the loop starts over at block 501.

Continuing to block 503 the program proceeds to timing of the subsequent RX signal pulse periods $T_2$, $T_3$ and $T_4$ between second and third, third and fourth, fourth and fifth pulse respectively. If any of the periods as they are measured and evaluated, is longer than 1 second the program starts over immediately at block 501. When final $T_4$ period is measured and if found to be smaller than 1 second the program proceeds to block 504. Signal periods $T_1$, $T_2$, $T_3$ and $T_4$ are stored in memory for additional analysis in later steps. Common speed measuring LIDAR both standard and advanced have signal pulse period that is shorter than 1 second so this value is selected as a period time threshold.

Continuing with the block 504, for the program to proceed to block 506 stored signal periods $T_1$ to $T_4$ are compared and must match each other within a predetermined tolerance window, also a database 505 is checked and must have a match for a $T_1=T_2=T_3=T_4$ period value in the table of pre-stored standard speed measuring LIDAR signal periods, otherwise the program continues to block 510. Tolerance window in this embodiment is set at 0.01% of the period time.

In block 510 similar to previous block 504, stored signal periods $T_1$ to $T_4$ are checked in the database 505 and must have a match in the table of pre-stored advanced speed measuring LIDAR groups of characteristic periods for the program to proceed to block 511, otherwise the program starts over at block 501.

Block 506 represents a successful detection of a standard speed measuring LIDAR signal by the algorithm and start of disrupting a standard speed measuring LIDAR with a fixed pulse period routine.

The program initiates an alert to a device operator through the user interface, warning light and sounds are activated. Next, the program 507 waits up to 1 second for reception of a pulse on receive RX signals, if pulse is received during wait the wait is aborted and disruption timer is immediately synchronized (reset) and program proceeds to 508, if no pulse arrives wait finishes and program goes to block 509. In step 508 the disruption timer reach is set to value of previously measured receive RX pulse period $T_1$=D decremented by 100 ns to set the phase of the disrupting transmission so that it arrives to LIDAR during LIDAR next time window and before its next original speed measuring pulse reflection arrives. Program waits for the disruption timer to times out and then momentary initiates a disruption pulse transmission on transmit TX signal. In preferred embodiment after the first disruption pulse transmission the disruption timer is again reset and disruption timer reach reloaded and procedure repeated 3 more times. This way on one speed measuring pulse used for synchronization following four speed measuring pulses are disrupted, n=4 periods. The program then loops back to block 507 to wait for another synchronization event.

In block 509 the program clears the alert to a device operator deactivating warning light and sounds, and starts over at block 501.

Block 511 represents a successful detection of an advanced speed measuring LIDAR signal by the algorithm and start of disrupting an advanced speed measuring LIDAR with random pulse repetition period routine.

The program initiates an alert to a device operator through the user interface, warning light and sounds are activated. Next, the program 512 reconfigures microcontroller 103 by disabling the receive signal lines 209 and 211, signals $RX_1$ and $RX_3$, and also disabling microcontroller 103 pins 3 and 5, signals $TX_2$ and $TX_4$, effectively turning first 101B and third laser transponder into transmitting only transponders and second 102B and fourth laser transponder into receiving only transponders.

The program 513 then starts discovering maximum allowable receiver sensitivity routine which is incorporated in to the disrupting an advanced speed measuring LIDAR with random pulse repetition period routine. In this block 513 the program initiates a pulse transmission on transmit TX signal that is used as a ping for checking of echo triggering on current sensitivity level of the receiving only transponders laser receiver. Program proceeds to block 514 where it is checked if the ping produced an echo triggering on receive RX signals, a presence of a received pulse. If no pulse has been received it means the current maximum receiver sensitivity level does not produce echo triggering on transmissions emanating from transmitting transponder and program proceeds to block 516, if pulse has been received the program proceeds to 515.

In block 515 current maximum receiver sensitivity is decreased by one and new value of sensitivity ceiling is commanded to receiving transponders laser receiver over PROG signal, the program loops to 513.

The discovering maximum allowable receiver sensitivity routine finishes when program reaches block 516. Here 516 the program waits up to 1 second for reception of a pulse on receive RX signals, if pulse is received during wait the wait is aborted and disruption timer is immediately synchronized (reset) and the disruption timer reach is set to multiple values equal to the values of periods in the found group of characteristic periods from the database for the detected advanced LIDAR, decremented by 100 ns.

Program waits for the disruption timer to times out multiple times and each time momentary initiates a disruption pulse transmission on transmit TX signal. During one of these disrupting transmissions or right after one a new speed measuring LIDAR pulse will be received by the receiving only transponder, at that moment the rest of disruption timer reach values from present cycle will be cleared and block 516 will restart into a loop by synchronizing the disruption timer and reloading disruption timer reach values again. If no pulse arrives on receive RX signals for more then 1 second the program continues to 517.

In block 517 the program clears the alert to a device operator deactivating warning light and sounds, reconfigures receive signal lines 209 and 211, signals $RX_1$ and $RX_3$, and microcontroller 103 pins 3 and 5, signals $TX_2$ and $TX_4$ to previous values, resets maximum receiver sensitivity ceiling of receiving transponders laser receiver to highest value over the PROG signal, and starts over at block 501.

It should be understood that the invention is not limited by the embodiments described above, but is defined solely by the claims.

The invention claimed is:

1. A laser transponder system for disrupting the operation of a distance and/or speed measuring LIDAR in response to a detected LIDAR signal, the system comprising:
    at least two laser transponders, a second transponder of the at least two laser transponders is a receiving only transponder and a first transponder of the at least two laser transponders is a transmitting only transponder and transmissions of the transmitting only transponder are not detected by the receiving only transponder, and
    a microcontroller that comprises pre-stored values in a database, selects microcontroller disrupting signal periods based on the pre-stored database according to the detected LIDAR signal, and,
    wherein a disrupting signal is transmitted simultaneously with synchronizing a disruption timer for a next period of the disrupting signal, and a timing of multiple disruption signal periods in parallel based on a given synchronization event, and
    the at least two laser transponders have a laser receiver with an adjustable gain controlled by the microcontroller, and the microcontroller reduces a sensitivity level of the receiving only transponder such that there is no echo triggering on transmissions emanating from the transmitting only transponder.

2. A laser transponder system for disrupting the operation of a distance and/or speed measuring LIDAR in response to a detected LIDAR signal, the system comprising:
    at least two laser transponders a second transponder of the at least two laser transponders is a receiving only transponder and a first transponder of the at least two laser transponders is a transmitting only transponder and transmissions of the transmitting only transponder are not detected by the receiving only transponder, and
    a microcontroller that comprises pre-stored values in a database, selects microcontroller disrupting signal periods based on the pre-stored database according to the detected LIDAR signal, and,
    wherein a disrupting signal is transmitted simultaneously with synchronizing a disruption timer for a next period of the disrupting signal, and a timing of multiple disruption signal periods in parallel based on a given synchronization event, and
    wherein a sensitivity of the receiving only transponder is predetermined and set to a level such that there is no echo triggering on transmissions emanating from the transmitting only transponder.

3. A method of operation of a laser transponder system for disrupting an operation of a distance and/or speed measuring LIDAR based on time-of-flight measurement, that comprises at least one laser receiving unit and at least one laser transmitting unit physically separated on a vehicle chassis and pointed in a direction of the LIDAR for which normal operation should be disrupted, where the laser receiving unit and the laser transmitting unit do not have any cross-talk; a receiver that is converting optical signals received from a laser receiving unit to electrical impulses which are sent to a microcontroller, where the microcontroller has pre-stored values in a database regarding the LIDARs and an algorithm with decision logic for the disruption operation based on a disruption timer D, and a user interface; wherein the method comprises:
    a) analysing, by the microcontroller, received LIDAR's signal from the laser receiving unit, which comprises a series of pulses, by extracting period times $T_i$ between observed pulses and comparing the periods $T_i$ with pre-stored values in the database, i) if the corresponding period times $T_i$ are identified within the database, the user is alerted and the system executes one of the LIDAR's counter measure of steps B or C depending on the nature of received periods $T_i$; and ii) if the corresponding period times Ti are not identified the system waits for the next signal or triggering event;
    b) in case all periods $T_i$ between the received pulses are equal or within a predetermined tolerance, the procedure for standard speed measuring LIDAR disruption is executed by setting the disruption timer D to a single value equal to the pulse repetition period of the LIDAR corrected for phase shift in the way that value D is decremented to set the phase of the disrupting signal; and when the disruption timer D times out the disruption timer D initiates disruption transmission on the laser transmitting unit; and
    c) in case periods $T_i$ between the received pulses are not equal or not within the predetermined tolerance, the procedure for advanced speed measuring LIDAR disruption is executed by setting the disruption timer D to multiple values corresponding to all possible advanced LIDAR periods, wherein each value D is corrected for the phase shift in such a way that value D is decremented to set the phase of the disrupting signal; and on each of the multiple values D when disruption timer D times out the disruption timer D initiates disruption transmission on the laser transmitting unit,
    wherein on each signal received by the laser receiving unit in step b) or c) the disruption timer D is reset, and wherein the process is finished in absence of LIDAR signals within a predetermined time window.

4. The method of operation of a laser transponder system according to claim 3, wherein cross-talk between the laser receiving unit and the laser transmitting unit is eliminated by using a receiver with an adjustable gain and a method for determination of a maximum allowable sensitivity level of the receiver, the determination method comprising:
  setting a gain on the laser receiving unit to maximum; and
  consecutively decreasing the receiver gain by the microcontroller, while the laser receiving unit is pinged by the laser transmitting unit until an echo is not observed by the laser receiving unit.

5. The method of operation of a laser transponder system according to claim 3 wherein two laser transponders are used, each transponder equipped with at least one laser receiving unit and at least one laser transmitting unit, and the laser transponders are geometrically separated on the vehicle chassis and pointed in the direction of the LIDAR whose normal operation is to be disrupted; wherein the laser transponders are reconfigurable in a way that one transponder is reconfigured into the transmitting only transponder and another is reconfigured into the receiving only transponder until the end of the disruption process defined in step C.

6. The method of operation of a laser transponder system according to claim 3, wherein the disrupting period D is decremented by 100 ns to set the phase of the disrupting signal.

7. A laser transponder system for disrupting the operation of a distance and/or speed measuring LIDAR based on time-of-flight measurement comprising means for carrying out the method of claim 3.

8. The laser transponder system as in claim 7, wherein two pairs of transponders are used, one pair mounted on the front end and pointed in the driving direction and another pair on the rear of the vehicle pointed opposite of the first pair.

9. The method of operation of a laser transponder system according to claim 4 wherein two laser transponders are used, each transponder equipped with at least one laser receiving unit and at least one laser transmitting unit, and the laser transponders are geometrically separated on the vehicle chassis and pointed in the direction of the LIDAR whose normal operation is to be disrupted; wherein the laser transponders are reconfigurable in a way that one transponder is reconfigured into the transmitting only transponder and another is reconfigured into the receiving only transponder until the end of the disruption process defined in step C.

* * * * *